US012654307B2

(12) United States Patent
Cherubini et al.

(10) Patent No.: US 12,654,307 B2
(45) Date of Patent: *Jun. 16, 2026

(54) MOBILE ROBOT, LABORATORY SYSTEM AND METHOD

(71) Applicant: Roche Diagnostics International AG, Rotkreuz (CH)

(72) Inventors: Claudio Cherubini, Cham (CH); Eugen Lusser, Alpnach Dorf (CH); Daniel Mueller, Meierskappel (CH); Erik Stroeken, Rotkreuz (CH)

(73) Assignee: ROCHE DIAGNOSTICS INTERNATIONAL AG, Rotkreuz (CH)

( * ) Notice: Subject to any disclaimer, the term of this patent is extended or adjusted under 35 U.S.C. 154(b) by 79 days.

This patent is subject to a terminal disclaimer.

(21) Appl. No.: 18/666,083

(22) Filed: May 16, 2024

(65) Prior Publication Data

US 2024/0383126 A1     Nov. 21, 2024

(30) Foreign Application Priority Data

May 19, 2023     (EP) ..................................... 23174325

(51) Int. Cl.
    *B25J 15/12*         (2006.01)
    *B25J 5/00*         (2006.01)
          (Continued)
(52) U.S. Cl.
    CPC ............. *B25J 5/007* (2013.01); *B25J 11/008* (2013.01); *B25J 15/12* (2013.01); *B25J 19/02* (2013.01)
(58) Field of Classification Search
    CPC . B25J 9/1661; B25J 9/163; B25J 5/007; B25J 11/008; B25J 15/12; B25J 19/02; G05B 2219/40391; G05B 2219/40116
    See application file for complete search history.

(56) References Cited

U.S. PATENT DOCUMENTS 8,965,580 B2 * 2/2015 Brooks .................. B25J 9/1671
                                                       700/259
10,793,047 B1 * 10/2020 Theobald .................. B60P 1/54
                        (Continued)

FOREIGN PATENT DOCUMENTS

WO     WO 2022/175919         8/2022

OTHER PUBLICATIONS

Choi et al., Development of flexible laboratory automation platform using Mobile Agents in the clinical laboratory, 2008, IEEE, p. 918-923 (Year: 2008).*

(Continued)

*Primary Examiner* — McDieunel Marc
(74) *Attorney, Agent, or Firm* — Woodard, Emhardt, Henry, Reeves & Wagner, LLP

(57) ABSTRACT

The disclosure relates to a mobile robot for a laboratory system, the mobile robot being adapted for transporting sample container carriers and for docking to at least one interface module of the laboratory system, the mobile robot comprising a driving base which is adapted to move the mobile robot over a laboratory floor on which the at least one interface module is to be placed, and a transport module mounted to the driving base, the transport module comprising a transport surface for carrying sample container carriers placed thereon, a sensor unit for detecting misalignment in positioning of the transport surface relative to the interface module upon docking, and an alignment drive unit for adjusting the transport surface relative to the driving base to compensate for detected misalignment.

15 Claims, 6 Drawing Sheets

Figure 2:
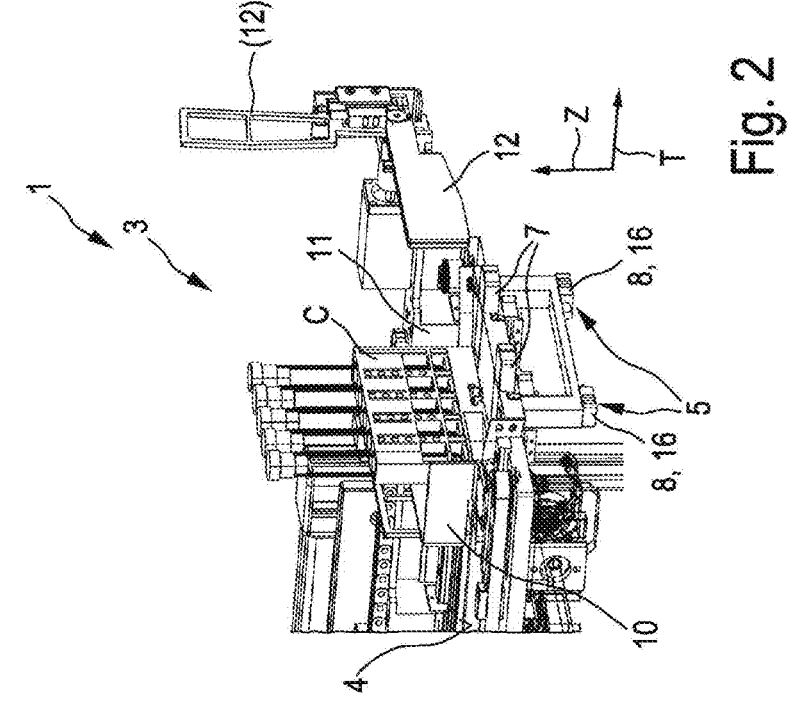

(51) Int. Cl.
    *B25J 11/00*        (2006.01)
    *B25J 19/02*        (2006.01)

(56) References Cited

U.S. PATENT DOCUMENTS

| | | | |
|---|---|---|---|
| 10,955,430 B2 | 3/2021 | Guarracina et al. | |
| 12,253,535 B2 * | 3/2025 | Cherubini | G16H 10/40 |
| 2008/0296853 A1 * | 12/2008 | Langford | B25J 5/005 |
| | | | 901/30 |
| 2009/0035181 A1 | 2/2009 | Chung et al. | |
| 2020/0348324 A1 | 11/2020 | Wikholm et al. | |
| 2021/0181220 A1 | 6/2021 | Grohbuhl | |
| 2021/0301967 A1 * | 9/2021 | Cook | F16L 55/34 |
| 2022/0229441 A1 | 7/2022 | Reiserer et al. | |
| 2023/0062676 A1 * | 3/2023 | Patil | B25J 9/0084 |
| 2023/0241768 A2 * | 8/2023 | Balasubramanian | |
| | | | B62D 57/028 |
| | | | 701/23 |

OTHER PUBLICATIONS

Brinkmann et al., Modular payload-items for payload-assembly and system enhancement for future planetary missions, 2018, IEEE, p. 1-12 (Year: 2018).*

Choi et al., Robotic laboratory automation platform based on mobile agents for flexible clinical tests, 2010, IEEE, p. 186-191 (Year : 2010).*

Mayer et alk., MOVEMENT—Modular Versatile Mobility Enhancement System, 2007, IEEE, p. 2892-2897 (Year: 2007).*

* cited by examiner

MOBILE ROBOT, LABORATORY SYSTEM AND METHOD

The invention relates to a mobile robot for a laboratory system, to a laboratory system and to a method for operating such a laboratory system.

Commonly, mobile robots can have a certain inaccuracy and/or imprecision in driving to a target position. A "stop position accuracy" and/or a "stop position repeatability" can be specified for the mobile robot, in particular said stop position repeatability typically being around +/−8 mm and +/−0.5°. In case a common mobile robot is to dock at an interface module of a laboratory system for transferring sample container carriers between the mobile robot and the interface module, the stop position accuracy and repeatability as well as any unevenness of a laboratory floor can lead to a gap in between the mobile robot and the interface module, said gap complicating a transfer of sample container carriers between the mobile robot and the interface module.

It is an object of the present invention to provide for a mobile robot for a laboratory system, and to provide for a laboratory system having such a mobile robot, and to provide for a method for operating such a laboratory system, in each case enabling particularly reliable transfer of sample container carriers between the mobile robot and an interface module of the laboratory system.

The mobile robot according to the invention is adapted for use in a laboratory system. Thus, the mobile robot can be a mobile laboratory robot. The mobile robot can be a self-guided vehicle or an autonomous-guided vehicle or an autonomous mobile robot. Preferably, the mobile robot is an autonomous mobile robot which is adapted for autonomously choosing its path of travel and/or autonomously dodging obstacles. In case the autonomous mobile robot detects an obstacle, the autonomous mobile robot can be configured to either wait for the obstacle to be removed or to circumnavigate the obstacle. The mobile robot is adapted for transporting sample container carriers. The sample container carriers may be adapted to carry sample containers. A sample to be stored within such a sample container may be a portion of a sample liquid, for example a blood sample. The sample container may be of tubular shape. The sample container may thus be a sample tube. The sample container carrier can be a 5-position rack, e.g. a rack for a maximum of five sample tubes. It goes without saying, that other forms of sample container carriers may be transported by the mobile robot, for example other types of racks or a single holder for holding a single sample tube. The mobile robot is adapted for docking to at least one interface module of the laboratory system. Therein, the mobile robot comprises a driving base. The driving base is adapted to move the mobile robot over a laboratory floor on which the at least one interface module is to be placed. Furthermore, the mobile robot comprises a transport module which is mounted to the driving base. Therein, the transport module comprises a transport surface for carrying sample container carriers placed thereon. The transport surface may be called transfer surface, synonymously. The transport module comprises a sensor unit for detecting misalignment in positioning of the transport surface relative to the interface module upon docking. The transport module comprises an alignment drive unit for adjusting the transport surface relative to the driving base in order to correct the detected misalignment. The correction of the detected misalignment may include correcting a height and/or inclination of the transport surface relative to a surface of the interface module and/or the laboratory floor. Furthermore, the correction of the detected misalignment may include an angular correction of a detected angular misalignment such that the edges of the transport surface of the transport module and the surface of the interface module are substantially in parallel to each other, in particular such that the gap has a substantially constant width along the edges. Due to the alignment, sample container carriers can be particularly reliably transferred between the interface module and the mobile robot.

According to an embodiment of the invention, the transport module has a pair of spring-biased fingers protruding in flush extension of the transport surface so that, upon docking, the gap in between the transport surface and the interface module can be bridged for sample container carriers to cross said gap by sliding over the spring-biased fingers. Therein, the spring-biased fingers can be displaced evenly or unevenly upon docking and thus supporting compensation of misalignment. Upon docking, the spring-biased fingers may contact the interface module. The angular misalignment can be corrected by angular rotation of the transport surface of the transport module such that the spring-biased fingers are displaced evenly afterwards.

According to another embodiment of the invention, the sensor unit comprises sensors for detecting a displacement of a respective spring-biased finger of the transport module and/or for detecting a displacement of the interface module at two points relative to the transport surface of the transport module. One such sensor can be arranged, in particular directly, behind each of the spring-biased fingers for detecting the displacement of a respective spring-biased finger. In addition or as an alternative, the sensor unit comprises sensors for detecting angular misalignment of the transport surface upon docking. In addition or as an alternative, the sensor unit comprises sensors for detecting a height of the transport surface above the laboratory floor and/or above a transport surface of the interface module upon docking. In addition or as an alternative, the sensor unit may comprise sensors for detecting a height position of the transport surface relative to the surface of the interface module. The height position may be defined by a specified vertical distance between the transport surface and the surface of the interface module. This can allow for a height alignment of the transport surface relative to the surface of the interface module independent of the absolute height of the transport surface of the interface module above the laboratory floor. In addition or as an alternative, the sensor unit comprises sensors for detecting a tilt of the transport surface relative to a surface of the interface module upon docking.

In the present context, angular misalignment can refer to a vertical spatial axis. A tilt of the transport surface can relate to at least one horizontal spatial axis, in particular to two perpendicular horizontal spatial axes. The vertical spatial axis may be a z-axis. One of the horizontal spatial axes may be a y-axis, whereas another one of the horizontal axes may be an x-axis. The vertical axis and both the horizontal axes may form a three-dimensional coordinate system for navigation, in particular self-navigation, of the mobile robot.

For detecting the displacement of the fingers, linear transducers can be used as sensors of the sensor system. Behind each of the fingers, such a linear transducer may be mounted. For the detection of the height and/or tilting, photoelectric proximity sensors can be used for the sensor system. In particular, two of such photoelectric proximity sensors can be foreseen for detecting the tilting of the transport surface, said two photoelectric proximity sensors being arranged apart from one another along one of the horizontal spatial axes, in particular perpendicular to a transport direction of the mobile robot. A batch lane direction may extend along the transport direction. The tilt of the transport surface can be compensated with reference to a first horizontal spatial axis extending along the batch lane direction and a second horizontal spatial axis extending perpendicular to the batch lane direction.

In particular, the sensor unit can comprise a sensor, which is arranged below the transport surface. Said sensor below the transport surface can be adapted for defining a basic position of the transport surface, in particular for an initialization of the mobile robot.

According to another embodiment of the invention, the alignment drive unit is adapted to horizontally level and/or vertically move the transport surface. For horizontally leveling the transport surface, the alignment drive unit can be adapted to actively tilt the transport surface with reference to at least one, in particular two perpendicular, horizontal spatial axes. For vertically moving the transport surface, the alignment drive unit can be adapted to linearly move the transport surface along the vertical spatial axis and/or to rotate the transport surface around at least one horizontal spatial axis. In particular, the alignment drive unit has at least two individually drivable vertical spindles. The alignment drive can have a drivable turntable for rotating the transport surface around the vertical spatial axis, in particular the turntable being independently drivable. The alignment drive unit may comprise a drivable horizontal spindle for actively compensating lateral misalignment of the transport surface relative to the interface module.

According to another embodiment of the invention, the transport module has a drivable sledge for pushing sample container carriers in a transport direction of the transport module over the transport surface and/or for retaining sample container carriers against the transport direction. The drivable sledge can have a clamping portion and/or a claw portion.

According to another embodiment of the invention, the transport module has a drivable slider for pushing sample container carriers in a transport direction off the transport surface, and/or for pushing sample container carriers against the transport direction onto the transport surface, and/or for retaining sample container carriers in the transport direction. In particular, the slider has a barrier portion which is pivot-drivable relative to the transport surface around the transport direction, in particular around an axis extending in parallel to the transport direction. Therein, the barrier portion is pivotable between a horizontal orientation for engaging with sample container carriers and an upright orientation for passing by sample container carriers.

According to another embodiment of the invention, the drivable sledge and the drivable slider are adapted for bidirectionally moving sample container carriers over and off the transport surface along the transport direction. In particular, sample container carriers arranged and/or clamped in between both the sledge and the slider can be moved along the transport direction by simultaneously driving both the sledge and the slider. Therein, both the slider and the sledge can have a barrier portion of similar function, thus allowing for unsteadily and/or discrete and/or batchwise conveying sample container carriers along the transport direction, bidirectionally.

According to another embodiment of the invention, the transport direction is oriented substantially in parallel or perpendicular to a driving direction of the mobile robot. The mobile robot can move, in particular drive, over the laboratory floor in the driving direction.

According to another embodiment of the invention, the mobile robot has a control unit. Therein, the control unit is adapted to control the alignment drive unit in a closed-loop-manner based on feedback from the sensor unit. In particular, the control unit is adapted to control the alignment drive unit so that the transport surface is above a surface of the interface module upon loading the interface module with sample container carriers from the mobile robot and/or below the surface of the interface module upon unloading the interface module with sample container carriers to the mobile robot, in each case by a predetermined vertical distance. The predetermined vertical distance can be 0.05 to 5.0 mm, in particular 0.1 to 1.0 mm, in particular 0.2 mm.

According to another embodiment of the invention, the control unit is adapted to control the alignment drive unit so that the transport surface is held in its closest position relative to the driving base and/or in its closest position relative to the laboratory floor if the mobile robot moves over the laboratory floor. The closest position may be a lowest position of the transport surface with respect to a gravitational direction, in particular along the vertical spatial axis. In particular, the closest position is 200 to 1,000 mm, in particular 300 to 790 mm, in particular 400 to 600 mm, in particular 530 mm, above the laboratory floor. This allows for achieving a particularly low center of gravity of the mobile robot when the mobile robot moves over the laboratory floor and for achieving a reduction of a sloshing of the liquid in the sample container when the mobile robot moves over the laboratory floor.

According to another embodiment of the invention, the alignment drive unit has an active and/or passive damping system for damping vibrations and/or shocks acting on the transport surface. Such a passive damping system may comprise a shock absorber. This allows for achieving a reduction of the sloshing of the liquid in the sample container when the mobile robot moves over the laboratory floor and/or over obstacles.

According to another embodiment, the transport surface cannot be rotated around the vertical spatial axis with respect to the driving base. According to another embodiments, the transport surface can be limitedly rotated relative to the driving base around the vertical spatial axis within a compensation angle of +5° to −5°.

According to another embodiment, the alignment drive unit is adapted for rotating the transport surface around the vertical spatial axis relative to the driving base by at least 90°, in particular by at least 180°, in particular by at least 270°, in particular by 360° and/or unlimitedly.

According to another embodiment of the invention, the alignment drive unit is adapted for turning or rotating the transport surface relative to the driving base around a vertical spatial axis, in particular by angular steps of 90° and/or 180°.

According to another embodiment of the invention, the driving base comprises at least three, in particular four, omni wheels. An "omni wheel" can be synonymously referred to as "Swedish wheel" and/or "Stanford wheel" and/or "Mecanum wheel". This allows for docking sideway to the interface module and loading and unloading of the sample container carriers in perpendicular direction to a main driving direction of the mobile robot.

According to another embodiment of the invention, the transport module has a funnel narrowing towards the transport surface, the funnel being adapted to compensate for lateral misalignment of the transport surface relative to the interface module upon docking and/or upon transferring sample container carriers. The funnel of the mobile robot can allow for compensation of sideway misalignment such that the sample container carriers can be pushed to a center by the funnel during unloading the interface module. The interface module may have a funnel similar, in particular corresponding, to that of the transport module. This can allow for docking sideway to the interface module and loading and unloading of the sample container carriers in perpendicular direction to the main driving direction of the mobile robot.

According to another embodiment of the invention, the mobile robot has two or more transport modules. Each transport module may form a lane for, in particular batchwise, transport of sample container carriers. In particular, at least two of the transport modules commonly share their alignment drive unit and/or their sensor unit. The lanes formed by each of the transport modules can be oriented in parallel or at an angle to one another. The transport modules can be arranged laterally aside one another and/or in a vertical stack-like manner.

The laboratory system according to the invention comprises at least one interface module. The interface module of the laboratory system is placed on a laboratory floor. The laboratory system furthermore comprises at least one mobile robot according to the invention. Thus, the advantages of the mobile robot according to the invention as described above transfer to the laboratory system according to the invention. The laboratory system can have a controller for controlling the at least one interface module and/or the at least one mobile robot. A lane of the interface module may have a funnel narrowing towards a surface of the interface module, said funnel being adapted to compensate for lateral misalignment of the transport surface relative to the interface module upon docking.

The method according to the invention for operating a laboratory system according to the invention comprises several steps. Therein, one step comprises moving, in particular autonomously driving, the mobile robot over the laboratory floor. Another step of the method comprises docking the mobile robot to the interface module, wherein the sensor unit detects a misalignment in positioning of the transport surface relative to the interface module and wherein the alignment drive unit adjusts the transport surface to compensate for detected misalignment. Another step comprises loading at least one sample container carrier off the transport surface to the interface module and/or unloading at least one sample container carrier off the interface module to the transport surface. The step of loading and/or unloading may be subsumed under a step of transferring sample container carriers between the transport surface and the interface module.

According to an embodiment of the invention, in particular of the method, the transport module of the mobile robot has a drivable sledge for pushing sample container carriers in a transport direction of the transport module over the transport surface and/or for retaining sample container carriers against the transport direction. Furthermore, the transport module has a drivable slider for pushing sample container carriers in the transport direction off the transport surface and/or for retaining sample container carriers in the transport direction. The drivable slider may be additionally adapted for pushing sample container carriers against the transport direction onto the transport surface. Therein, the slider has a barrier portion pivot-drivable relative to the transport surface around the transport direction, the barrier portion being pivotable between a horizontal orientation for engaging with sample container carriers and an upright orientation for passing by sample container carriers.

Therein, the step of loading the interface module comprises pivoting the barrier portion to its upright orientation and then driving the sledge to push sample container carriers in the transport direction so that the pushed sample container carriers pass by the barrier portion. Furthermore, the step of loading the interface module comprises pivoting the barrier portion to its horizontal orientation and then driving the slider to push the sample container carriers that have previously passed by the barrier portion in the transport direction off the transport surface and into the interface module. In addition or as an alternative, the step of unloading the interface module comprises pivoting the barrier portion to its upright orientation and then driving an interface sledge of the interface module to push sample container carriers against the transport direction so that the sample container carriers pass by the barrier portion. Then, the barrier portion is pivoted to its horizontal orientation and the slider is driven to push the sample container carriers that have previously passed by the barrier portion against the transport direction onto the transport surface to be placed on the transport surface. The step of unloading the interface module furthermore comprises the sample container carriers placed on the transport surface being retained in the transport direction by means of the barrier portion in its horizontal orientation.

The mobile robot and/or the laboratory system according to the invention allow for transport of sample container carriers without use of any superordinate box or tray.

A reference device of the laboratory system can be mounted to the interface module, said reference device being adapted for interaction with the sensor unit and/or for giving a reference for the height and/or the tilting compensation. The reference device can comprise a metal sheet, in particular extending vertically.

A number of lanes of the mobile robot may be equal to or different from a number of lanes of the interface module. Each lane of the mobile robot may be formed by a respective transport surface. Each lane of the interface module may be formed by a respective surface of the interface module.

In case the mobile robot is adapted for laterally loading and/or unloading sample container carriers from the interface module with respect to a driving direction of the mobile robot, a driving path of the mobile robot upon docking can have a flat S-shape. This can allow for particular reliable docking, in particular if the transfer surface is not rotatable relative to the driving base around the vertical spatial axis.

Portions of the laboratory floor can be uneven and stations of the laboratory system, such as the interface module, can have different heights, in particular due to the unevenness of the floor or due to their installation or due to mechanical tolerances.

The sample container carriers can have a relatively small footprint, thus, transfer of said sample container carriers between the mobile robot and the interface module via the gap in between the interface module and the mobile robot may be particularly challenging, in particular when using an additional superordinate larger tray for holding one or more sample container carriers is to be refrained from. The use of additional superordinate larger trays would result in additional effort for empty tray logistics.

Typically, space in the clinical labs can be very narrow. For example, a width of corridors can be rather small such that a free moving space for the mobile robot can be limited. Furthermore, lab personnel may use the same space of the laboratory floor, which may further limit the moving space for the mobile robot or the free moving space for the lab personnel. Depending on a lab size, a fleet of mobile robots might be in use, which can limit the available space even more.

The laboratory system may comprise a fleet of mobile robots. The mobile robots may be adapted for swarm-like interaction.

In contrast to common conveyor belts, the mobile robot according to the invention can transport samples in sample container carriers in batches, e.g. batchwise. However, sometimes it might appear unnecessary for a whole batch to be transported to the same interface module, since several interface modules may be placed in different rooms or since not the same systems are connected to all interface modules. Therefore, a resource manager software can be used to define from where to where, e.g. from which system to which system, the samples are to be transported.

As indicated above, the invention can allow for rotational alignment of the transport surface relative to the interface module. In particular, an adjustment of an angle around a vertical spatial axis of the transport surface relative to the interface module can be made such that face sides of the transport surface and of the interface module are aligned substantially in parallel. A distance and/or proximity sensor behind each spring-biased finger can be used to adjust for said parallelism. The spring-biased fingers can have two functions, a first being bridging and a second being angle correction and/or compensation.

Furthermore, the invention can allow for height and/or tilting alignment of the transport surface relative to the interface module. An adjustment of the height and/or angle around at least one horizontal spatial axis of the transport surface relative to the interface module can be made such that the face sides of the transport surface and the interface modules are substantially in parallel to one another, in particular to account for uneven floors or mechanical tolerances of the stations.

In particular, the transport surface can be adjusted by the alignment drive unit so that the transport surface is substantially in a plane with a surface of the interface module.

In particular, the transport surface can be moved sideways by the alignment drive unit with respect to a driving direction of the mobile robot, in particular to compensate for lateral misalignment, in particular of greater than 8 mm. This can enable the benefit that a less precise and accurate positioning is needed, what facilitates a positioning process by the mobile robot itself and thus results in less time for positioning the mobile robot in front of the interface module. Furthermore, the alignment capability of the transport module can be less dependent on the mobile robot stop position accuracy and precision.

In particular, when transferring sample container carriers, said sample container carriers may directly slide over the transport surface and/or over the surface of the interface module. Direct sliding of the sample container carriers on the transport surface and/or on the surface of the interface module can have the benefit that additional superordinate trays may be refrained from, thus, no handling and/or other logistics for such trays is needed.

For transfer, sample container carriers may be pushed as a batch, e.g. one to thirty 5-position-racks, by means of the drivable sledge and the drivable slider. Therein, the drivable sledge may be used to push the batch from the mobile robot towards the interface module. The drivable sledge might not be able to move over an edge of the mobile robot footprint. However, the drivable slider can be moved over the edge such that, in particular remaining, sample container carriers can be pushed completely over to the interface module.

The drivable slider can be additionally used to push sample container carriers from the interface module to the mobile robot after movable claws of the interface module, in particular of the drivable sledge of the interface module, have pushed a majority of sample container carriers onto the mobile robot.

Both the sledge and the slider of the mobile robot may serve as clamps to hold the batch of sample container carriers in place during transport on the transport surface of the mobile robot and/or to avoid tilting of sample containers carried by the sample container carriers during transport and/or driving.

A step height between a finger top surface and the interface surface may be controlled upon docking, in particular in a closed-loop-manner. The step height may be controlled to avoid that there is mechanical impact and/or shock and/or momentum on sample tubes that can otherwise result in spillage. The step height may be controlled to avoid sample container carriers to get stuck at the step. The step height may be controlled to avoid that there is a mechanical impact and/or shock and/or momentum on sample tubes resulting in spillage from open tubes when being transferred and/or pushed via the fingers. A pushing speed should not be too fast to reduce the probability of spillage from opened tubes when being transferred over the step. The step can go down or up depending on the direction of transfer to avoid that sample container carriers get stuck or tip over. The step height may be the vertical distance.

Shock absorbers of the damping system can have hydraulic or pneumatic elements. Passive vibration damping systems can have mechanical devices, fluids and/or elastomeric materials. Active vibration damping systems can have sensors and actuators in closed-loop systems. The damping systems can be integrated in the transport module to reduce the impact of shocks and/or vibrations acting on sample tubes during their transport by the mobile robot, e.g. during driving of the mobile robot. Such a damping system allows for reducing shocks and/or vibrations during driving and thus to reduce the amount of shock and/or vibration energy transmitted to the transport surface and/or sample container carriers placed thereon, which can be of particular advantage in special cases like driving into an elevator or over cable ducts where larger impacts and/or shocks and/or momentum can affect the sample liquid. A damping capability of the damping systems may be designed according to occurring or expected vibrations and/or shocks, in particular including a safety factor.

Vibrations, abrupt movements and/or shocks during transfer or during driving can have a negative impact on a sample integrity such as for example lysis of red blood cells, platelet resuspension in coagulation assays or cross-contamination due to spillage from opened or decapped tubes, for example as a result of too much sloshing of the sample liquid. Too much tilting of sample tubes within the sample container carriers may thus be avoided in order to prevent spillage from opened tubes. Thus, the tubes may be kept as straight as possible and are to be transferred as smoothly as possible.

Moving down the transport surface of the mobile robot to the closest position during driving of the mobile robot can help to reduce sloshing of the liquid in the sample tubes. The sloshing can be a result of driving movements and the contact of the mobile robot with the laboratory floor. In particular, driving over cable ducts or driving into an elevator can lead to large liquid movements and/or sloshing which could result in spillage in the worst case. The lower the transport surface, the less liquid sloshing, since the relative movement of a sample tube opening to the wheel axis may increase with increased distance from the wheel axis. For example, the transport surface can be moved down by about 250 mm. Besides lowering the transport surface, reducing the driving speed of the mobile robot can help to avoid sloshing.

A combination of damping and moving down the surface may be beneficial in addition to slow driving speeds.

A transfer of sample tubes may take place via a front or via a back of the mobile robot or via a left or a right side or via combinations thereof, in particular afore-mentioned orientations referring to a driving direction of the mobile robot. In particular, lateral transfer can be beneficial in narrow environments like narrow corridors where the mobile robot might not be able to drive forwards to the interface module due to lack of space for driving straight to a target position. Lateral transfer of samples can allow the mobile robot to position itself sideways to the interface module along the corridor and to load and/or unload sample container carriers via the respective side of the mobile robot. Less space may be needed in front of the interface module. Different mobile robots may easier pass each other or pass by persons. A taxi queue next to the interface module may be possible if a fleet of mobile robots is used and if said mobile robots want to load or unload at the same interface module.

A capability to unload either via the left side or via the right side may reduce required drive movements in narrow corridors. Such a capability may be achieved by the drivable sledge and the drivable slider being adapted for bidirectionally moving sample container carriers over the transport surface. For example, the mobile robot does not need to change direction if it needs to transport a batch of samples to an interface module positioned at the right side of the corridor and to another interface module positioned on the left side of the corridor.

The afore-described surface alignment principle may be used for the lateral unloading and/or loading as well as for unloading and/or unloading via the front and/or back of the mobile robot.

The mobile robot can be an omnidirectional mobile robot that can be able to drive forward and/or backwards and that is able to rotate without changing its footprint and that can drive sideways without substantial rotation to the target position in front of the interface module. For lateral unloading and/or loading, the mobile robot may need some space to its left and/or right to the interface module, so that the mobile robot can drive to its target position in front of the interface module upon docking.

A mobile robot having omni wheels may be able to drive laterally to the target position. Therefore, no additional space might be needed left or right of the interface module for lateral unloading and/or loading.

In order to increase the flexibility and/or granularity to send and receive samples to and from different interface modules, the transport module can comprise more than one lane, e.g. up to four lanes with batches of 5-position-racks in the case of unloading and/or loading via the side. Alternatively, the transport module can comprise a single lane for a single batch, e.g. with up to 150 sample tubes.

For example, the mobile robot may unload or load a first batch of sample container carriers at the interface module and a second batch at another interface module. Additionally, the mobile robot may load and unload another batch at the same interface module without driving away. For example, the mobile robot can unload a first batch at the interface module and load a third batch at the interface module at the same time and/or position, what can increase a throughput and reduce a turnaround time. Loading and unloading of batches at the same interface module can be done without change of position or with a slight change of the mobile robot position, e.g. the mobile robot may slightly drive forward in the case of sideways positioning to the interface module. In case the mobile robot is not to change position, the interface module may need to have corresponding loading and unloading lanes at corresponding positions for unloading and loading at the same time at the same interface module.

The same surface alignment principle as described above may work with more than one lane. Each lane needs spring-loaded fingers, but only at least two fingers need to have sensors integrated by rotational alignment. In particular, the laterally outermost fingers may have integrated sensors, in particular for a more precise control and compensation of misalignment.

Further advantages and features of the invention arise from the claims as well as from the following description of a preferred embodiment of the invention, which is depicted by the drawings. Therein, equal reference signs relate to equal or similar or functionally equal components.

It is to be understood that features mentioned above as well as features described below are not only usable in the stated combination, respectively, but also in other combinations or solely, without leaving the frame of the present invention.

Figure 1:
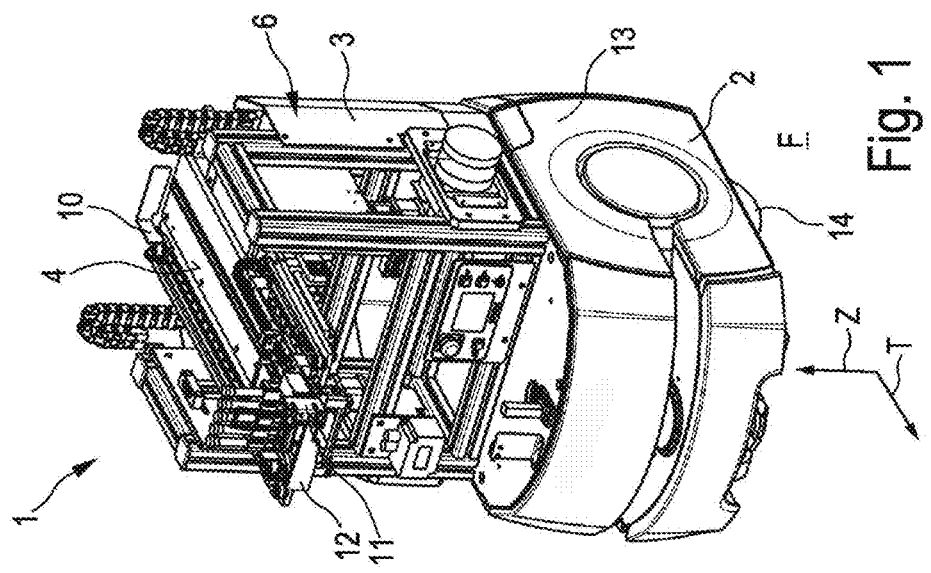
Figure 4:
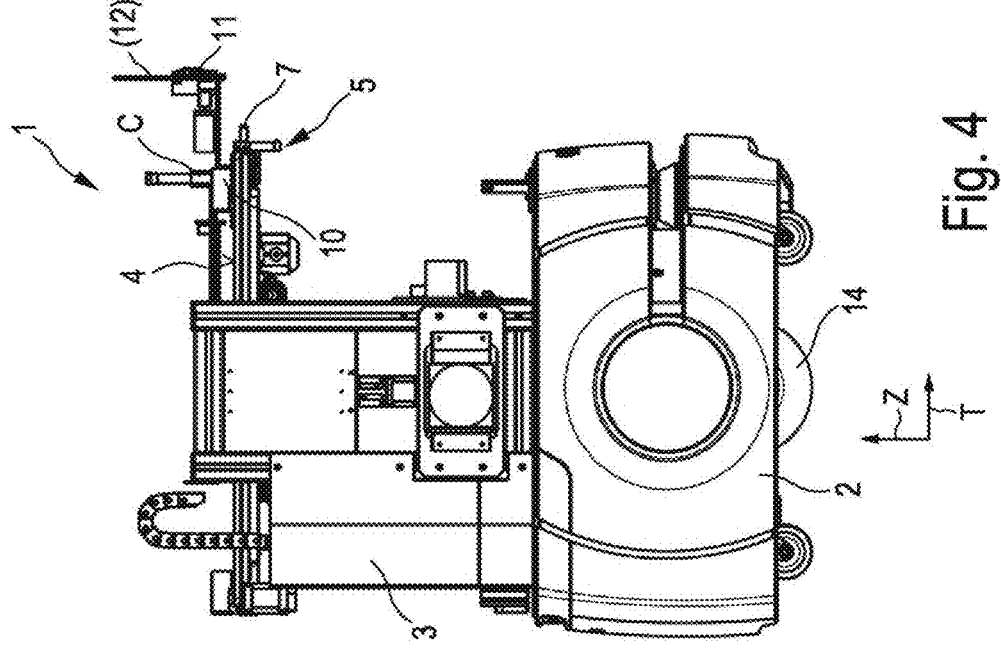
Figure 3:
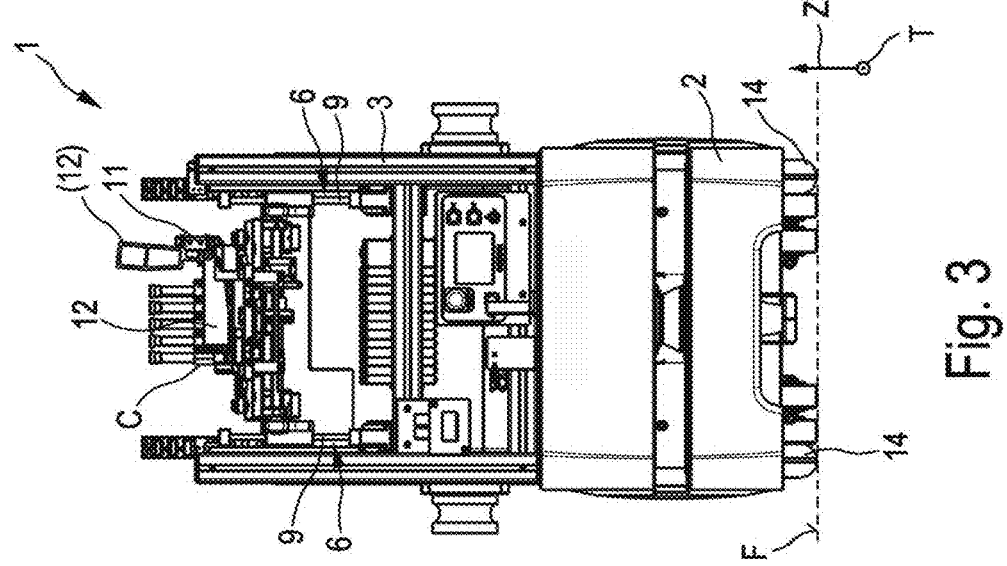
Figures 5, 6:
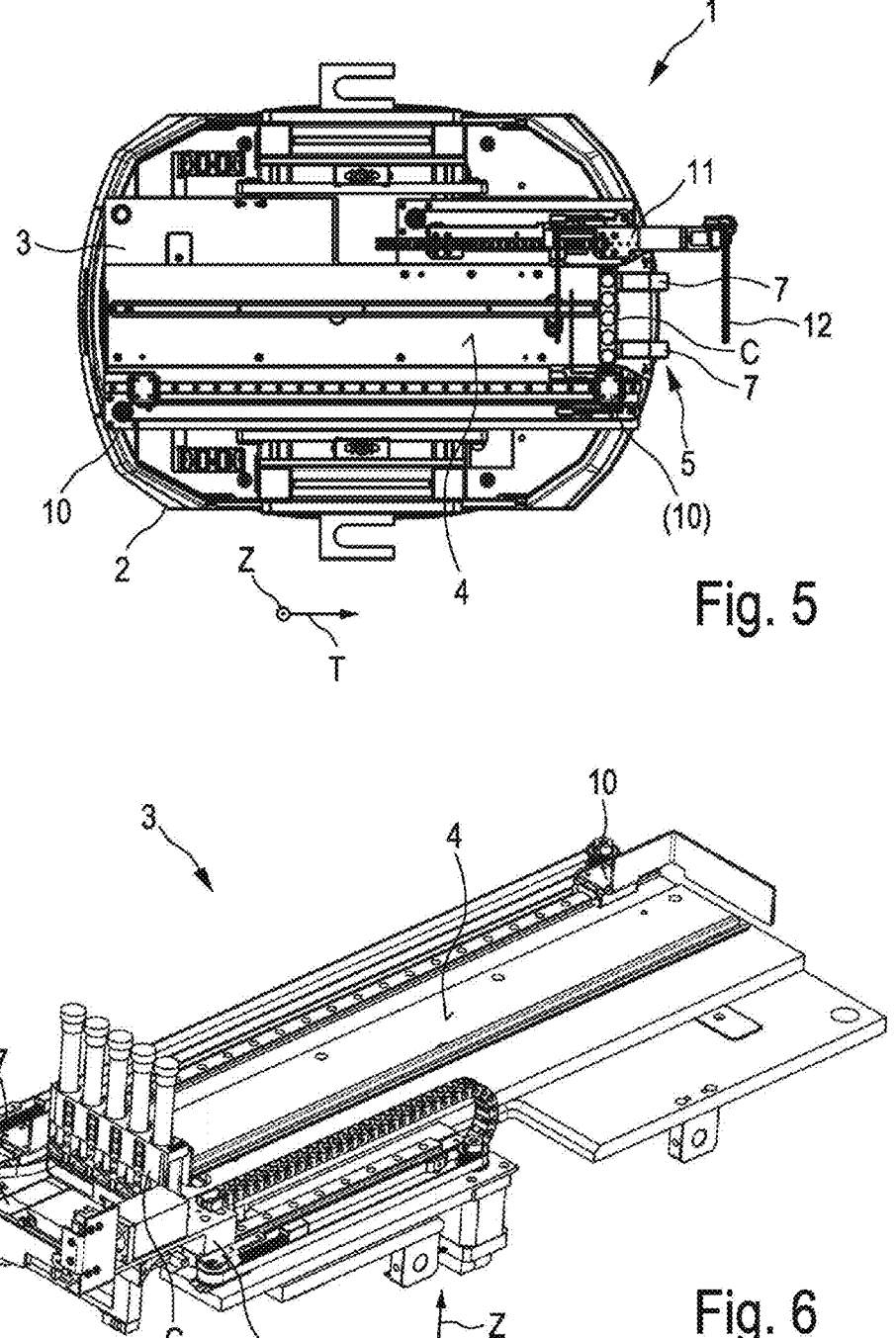
Figure 7:
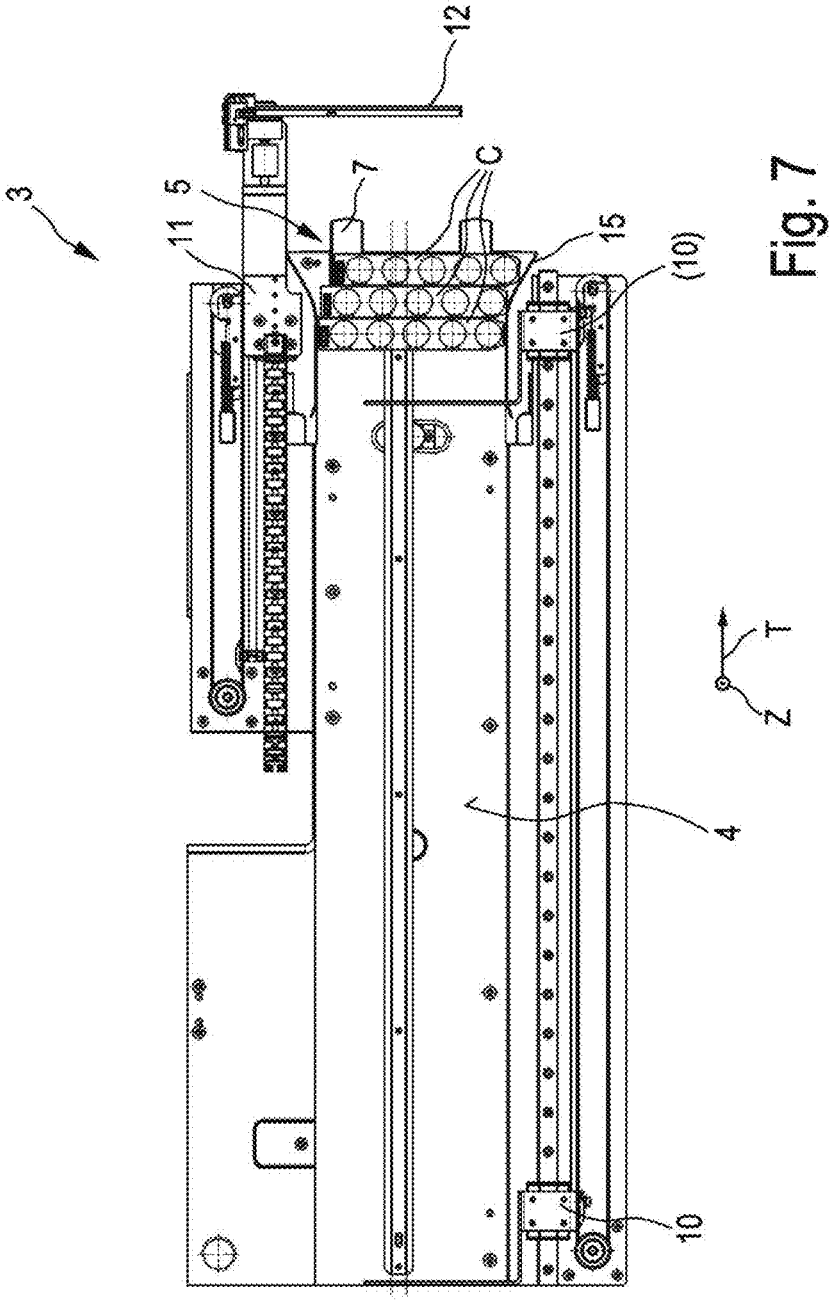
Figure 8:
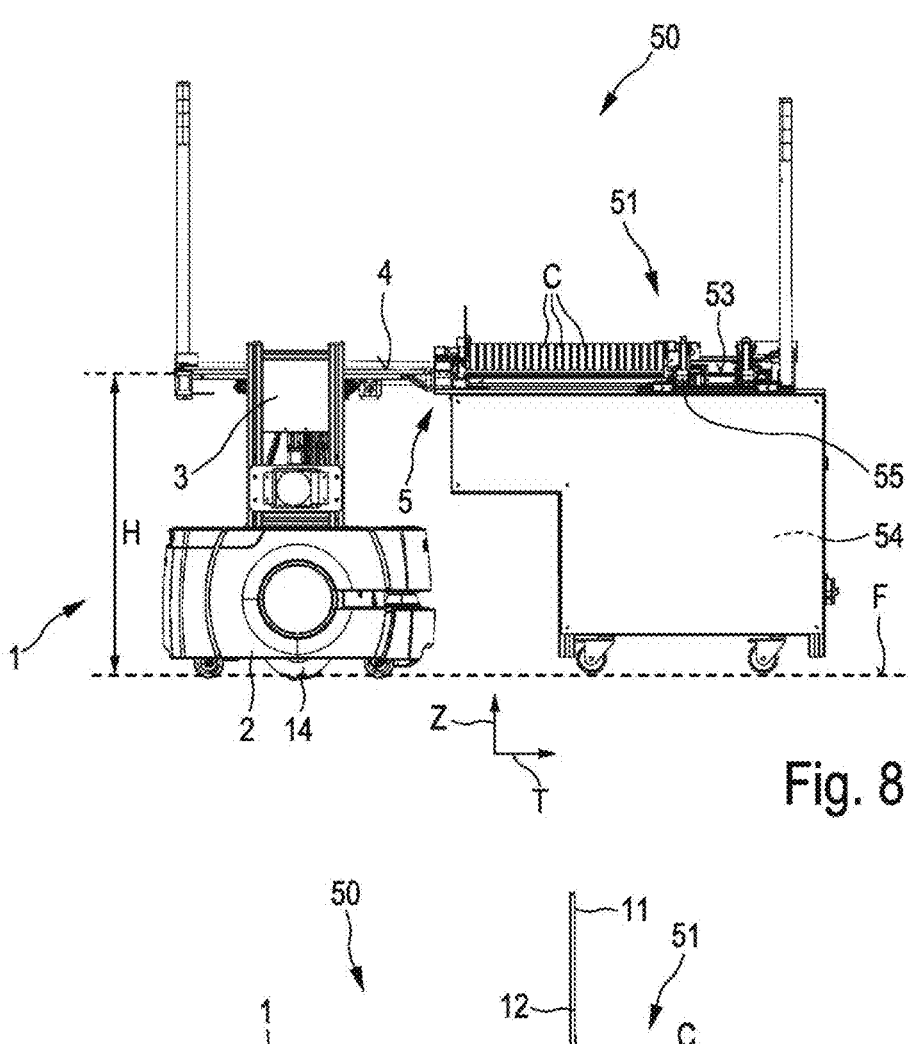
Figure 9:
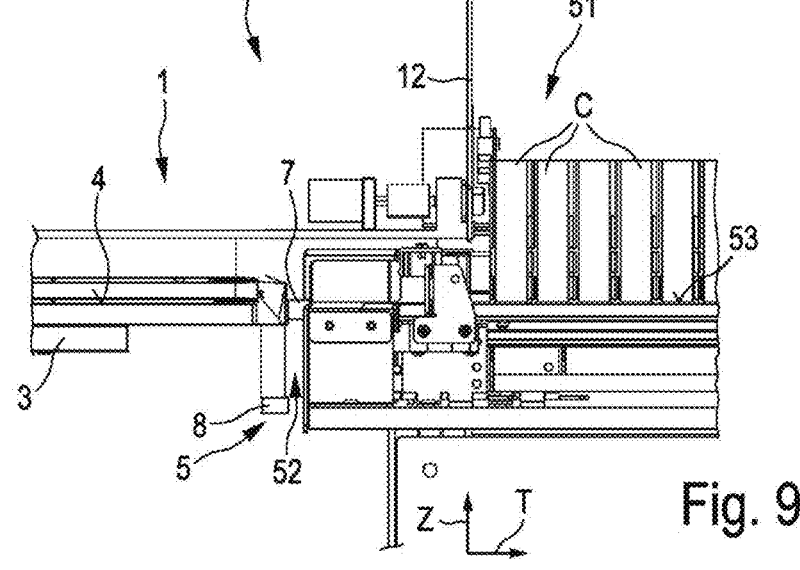
Figure 10:
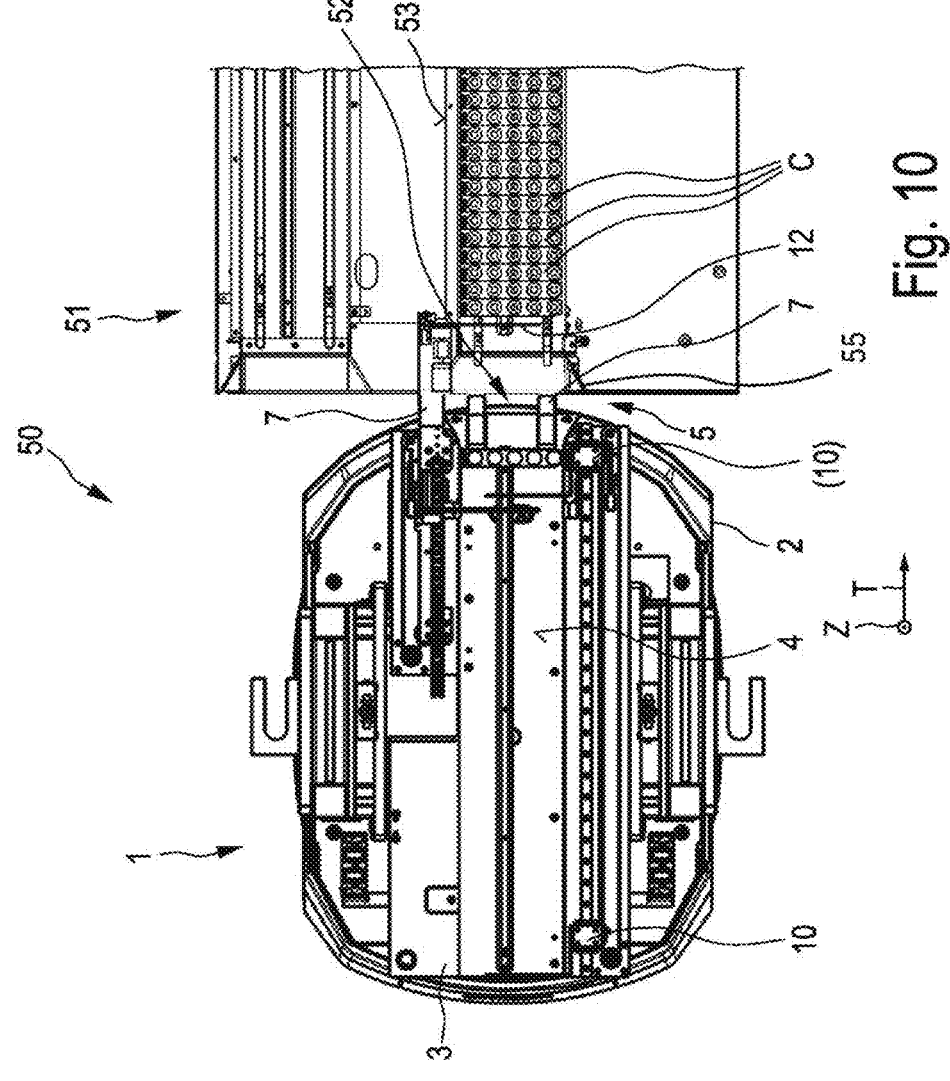

FIG. 1 schematically depicts, in a perspective view, an embodiment of a mobile robot according to the invention, FIG. 2 illustrates, in a perspective view, a detail of the mobile robot according to FIG. 1, FIG. 3 illustrates, in a front view, the mobile robot according to FIG. 1, FIG. 4 illustrates, in a side view, the mobile robot according to FIG. 1, FIG. 5 illustrates, in a top view, the mobile robot according to FIG. 1, FIG. 6 separately illustrates, in a perspective view, a transport module of the mobile robot according to FIG. 1, FIG. 7 illustrates, in a top view, the transport module according to FIG. 6, FIG. 8 illustrates, in a side view, an embodiment of a laboratory system according to the invention and having the mobile robot according to FIG. 1, FIG. 9 illustrates, in a side view, a detail of the laboratory system according to FIG. 8, and FIG. 10 illustrates, in a top view, the laboratory system according to FIG. 8.

A laboratory system 50 comprises at least one interface module 51 and at least one mobile robot 1. The laboratory system 50 can be a laboratory sample distribution system. The laboratory system 50 can have a controller 54 for controlling the at least one interface module 51. In addition or as an alternative, the controller 54 can be adapted for controlling the at least one mobile robot 1. The mobile robot 1 is adapted for transporting sample container carriers C. Furthermore, the mobile robot 1 is adapted for docking to the at least one interface module 51.

The mobile robot 1 comprises a driving base 2 which is adapted to move the mobile robot 1 over a laboratory floor F. Therein, the at least one interface module 51 is placed on the laboratory floor F.

The mobile robot 1 comprises a transport module 3 which is mounted to the driving base 2. The transport module 3 can be mounted on top of the driving base 2. Therein, the transport module 3 comprises a transport surface 4 for carrying sample container carriers C placed thereon. The transport surface 4 can be a transfer surface. The transport module 3 has a sensor unit 5 which is adapted for detecting misalignment in positioning of the transport surface 4 relative to the interface module 51 upon docking. Furthermore, the transport module 3 comprises an alignment drive unit 6 for adjusting the transport surface 4 relative to the driving base 2 to compensate for detected misalignment.

For example, the transport module 3 comprises a pair of spring-biased fingers 7. Each of the fingers 7 protrudes in flush extension of the transport surface 4 so that, upon docking, a gap 52 in between the transport surface 4 and the interface module 51 can be bridged for sample container carriers C to cross the gap 52 by sliding over the spring-biased fingers 7. The sensor fingers 7 may be independently displaceable along a transport direction T of the mobile robot 1, in particular through docking contact with the interface module 51.

For example, the sensor unit 5 comprises sensors 16, 8. The sensors 16, 8 can be position sensors and/or distance sensors and/or proximity sensors. The sensors 16, 8 can be adapted for detecting a displacement of a respective spring-biased finger 7. As an alternative or in addition, the sensors 16, 8 can be adapted for detecting angular misalignment of the transport surface 4 upon docking. In addition or as an alternative, the sensors 16, 8 can be adapted for detecting a height H of the transport surface 4 above the laboratory floor F and/or above a surface 53 of the interface module 51. In addition or as an alternative, the sensors 16, 8 can be adapted for detecting a tilt of the transport surface 4 upon docking relative to the surface 53 of the interface module 51.

For instance, the alignment drive unit 6 is adapted to horizontally level the transport surface 4. In addition or as an alternative, the alignment drive unit 6 is adapted to vertically move the transport surface 4. Therein, the alignment drive unit 6 can have at least two individually drivable vertical spindles 9, in particular allowing for horizontally leveling the transport surface 4. In addition, the alignment drive unit 6 can have a turntable, which allows for turning the transport surface 4 around a vertical spatial axis Z of the mobile robot 1.

For example, the transport module 3 has a drivable sledge 10. The drivable sledge 10 is adapted for pushing sample container carriers C in the transport direction T of the transport module 3 over the transport surface 4. In addition or as an alternative, the drivable sledge 10 is adapted for retaining sample container carriers C against the transport direction T, in particular when the mobile robot 1 is driving over the laboratory floor F.

As to be seen from the figures, the transport module 3 has a drivable slider 11. The drivable slider 11 is adapted for pushing sample container carriers C in the transport direction T off the transport surface 4. In addition or as an alternative, the drivable slider 11 is adapted for retaining sample container carriers C in the transport direction T, in particular when the mobile robot 1 is driving over the laboratory floor F. For example, the slider 11 has a barrier portion 12 which is pivot-drivable relative to the transport surface 4 around the transport direction T. Therein, the barrier portion 12 can be pivotable between a horizontal orientation for engaging with sample container carriers C and an upright orientation for passing by sample container carriers C.

In embodiments not shown in the figures, the sledge 10 can have a barrier portion similar to that of the slider 11, in particular allowing for bidirectionally moving sample container carriers C over the transport surface 4 along the transport direction T by interaction of the drivable sledge 10 and the drivable slider 11. Therein, the transport direction T can be oriented substantially in parallel or perpendicular to a driving direction of the mobile robot 1.

In the example of the figures, the transport direction T is equal to the driving direction of the mobile robot 1.

For instance, the mobile robot 1 has a control unit 13. Therein, the control unit 13 is adapted to control the alignment drive unit 6 in a closed-loop-manner based on feedback from the sensor unit 5. The control unit 13 can be adapted to control the alignment drive unit 6 so that the transport surface 4 is above a surface 53 of the interface module 51 upon loading the interface module 51 with sample container carriers C from the mobile robot 1. In addition or as an alternative, the control unit 13 is adapted to control the alignment drive unit 6 so that the transport surface 4 is below the surface 53 of the interface module 51 upon unloading the interface module 51 with sample container carriers C to the mobile robot 1. In either case, during loading the interface module 51 or during unloading the interface module 51, there can be a predetermined vertical distance or step between the transport surface 4 and the surface 53. The predetermined vertical distance can be 0.05 to 5.0 mm, in particular 0.1 to 1.0 mm, in particular 0.2 mm.

For example, the control unit 13 is adapted to control the alignment drive unit 6 so that the transport surface 4 is held in its closest position relative to the driving base 2. In addition or as an alternative, the control unit 13 is adapted to control the alignment drive unit 6 so that the transport surface 4 is held in its closest position relative to the laboratory floor F. The transport surface 4 can be held in its closest position if the mobile robot 1 moves over the laboratory floor F. Therein, the closest position can be 200 to 1,000 mm, in particular 300 to 790 mm, in particular 400 to 600 mm, in particular 530 mm, above the laboratory floor F, in particular vertically.

For instance, the alignment drive unit 6 has an active damping system for damping vibrations and/or shocks acting on the transport surface 4 and/or sample container carriers C placed thereon. In addition or as an alternative, the alignment drive unit 6 has a passive damping system for damping vibrations and/or shocks acting on the transport surface 4.

The alignment drive unit 6 can be adapted for turning the transport surface 4 around the vertical spatial axis Z, in particular by angular steps of 90° or 180° or substantially steplessly. The driving base 2 can comprise at least three, in particular four, omni wheels 14.

As to be seen from the figures, the transport module 3 has a funnel 15. The funnel 15 can narrow towards the transport surface 4. The interface module 51 can have a funnel 55 narrowing towards the surface 53 of the interface module 51. The funnel 15 and/or the funnel 55 can be adapted to compensate for lateral misalignment of the transport surface 4 relative to the interface module 51 upon docking.

The mobile robot 1 can have two or more transport modules 3. Therein, at least two of the transport modules 3 can commonly share their alignment drive unit 6 and/or their sensor unit 5. Each transport module 3 may form a lane of the mobile robot 1 for a respective batch of samples.

According to the invention, the laboratory system 50 is operated as follows. When operating the laboratory system 50, the mobile robot 1 is moved over the laboratory floor F. In particular, the mobile robot 1 can autonomously drive over the laboratory floor F. Then, the mobile robot 1 docks to the interface module 51, wherein the sensor unit 5 detects a misalignment in positioning of the transport surface 4 relative to the interface module 51. Upon docking, the alignment drive unit 6 adjusts the transport surface 4 to compensate for detected misalignment. When operating the laboratory system 50, at least one sample container carrier C can be transferred from the transport surface 4 to the interface module 51. In addition or as an alternative, at least one sample container carrier C can be transferred from the interface module 51 to the transport surface 4.

For example, a step of loading the interface module 51 with sample container carriers C comprises pivoting the barrier portion 12 to its upright orientation and driving the sledge 10 to push sample container carriers C in the transport direction T so that the pushed sample container carriers C pass by the barrier 12. Then, the barrier portion 12 is pivoted to its horizontal orientation and the slider 11 is driven to push the sample container carriers C that have previously passed by the barrier portion 12 in the transport direction T off the transport surface 4 and into the interface module 51.

For example, a step of unloading the interface module 51 comprises pivoting the barrier portion 12 to its upright orientation and driving an interface sledge 54 of the interface module 51 to push sample container carriers C against the transport direction T so that the sample container carriers C pass by the barrier portion 12. Then, the barrier portion 12 is pivoted to its horizontal orientation and the slider 11 is driven to push the sample container carriers C that have previously passed by the barrier portion 12 against the transport direction T onto the transport surface 4 for the sample container carriers C to be placed on the transport surface 4. The step of unloading the interface module 51 furthermore comprises pivoting the barrier portion 12 to its horizontal orientation so that the sample container carriers C placed on the transport surface 4 are retained in the transport direction T by means of the barrier portion 12 in its horizontal orientation.

The invention claimed is:

1. A mobile robot for a laboratory system, the mobile robot being adapted for transporting sample container carriers and for docking to at least one interface module of the laboratory system, the mobile robot comprising a driving base which is adapted to move the mobile robot over a laboratory floor on which the at least one interface module is to be placed, and a transport module mounted to the driving base, the transport module comprising a transport surface for carrying sample container carriers placed thereon, a sensor unit for detecting misalignment in positioning of the transport surface relative to the interface module upon docking, and an alignment drive unit for adjusting the transport surface relative to the driving base to compensate for detected misalignment.

2. The mobile robot according to claim 1, characterized in that, the transport module has a pair of spring-biased fingers protruding in flush extension of the transport surface so that, upon docking, a gap in between the transport surface and the interface module can be bridged for sample container carriers to cross the gap by sliding over the spring-biased fingers.

3. The mobile robot according to claim 1, characterized in that the sensor unit comprises, in particular position, sensors for detecting a displacement of a respective spring-biased finger of the transport module, and/or for detecting angular misalignment of the transport surface upon docking, and/or for detecting a height position of the transport surface relative a the surface of the interface module, and/or for detecting a height of the transport surface above the laboratory floor, and/or for detecting a tilt of the transport surface upon docking relative to a surface of the interface module.

4. The mobile robot according to claim 1, characterized in that the alignment drive unit is adapted to horizontally level and/or vertically move the transport surface, in particular the alignment drive unit having at least two individually drivable vertical spindles.

5. The mobile robot according to claim 1, characterized in that the transport module has a driveable sledge for pushing sample container carriers in a transport direction of the transport module over the transport surface and/or for retaining sample container carriers against the transport direction.

6. The mobile robot according to claim 1, characterized in that the transport module has a driveable slider for pushing sample container carriers in a transport direction off the transport surface, and/or for pushing sample container carriers against the transport direction onto the transport surface, and/or for retaining sample container carriers in the transport direction, in particular the slider having a barrier portion pivot-drivable relative to the transport surface around the transport direction, the barrier portion being pivotable between a horizontal orientation for engaging with sample container carriers and an upright orientation for passing by sample container carriers.

7. The mobile robot according to claim 5, characterized in that the driveable sledge and the driveable slider are adapted for bidirectionally moving sample container carriers over and off the transport surface along, in particular in and/or against, the transport direction, and/or in that the transport direction is oriented substantially in parallel or perpendicular to a driving direction of the mobile robot.

8. The mobile robot according to claim 1, characterized in that the mobile robot has a control unit, the control unit being adapted to control the alignment drive unit in a closed-loop-manner based on feedback from the sensor unit, in particular the control unit being adapted to control the alignment drive unit so that the transport surface is above a surface of the interface module upon loading the interface module with sample container carriers from the mobile robot and/or below the surface of the interface module upon unloading the interface module with sample container carriers to the mobile robot by a predetermined vertical distance, in particular by 0.05 to 5.0 mm, in particular 0.1 to 1.0 mm, in particular by 0.2 mm.

9. The mobile robot according to claim 8, characterized in that the control unit is adapted to control the alignment drive unit so that the transport surface is held in its closest position relative to the driving base and/or in its closest position relative to the laboratory floor if the mobile robot moves over the laboratory floor, in particular the closest position being 200 to 1000 mm, in particular 300 to 790 mm, in particular 400 to 600 mm, in particular 530 mm, above the laboratory floor.

10. The mobile robot according to claim 1, characterized in that the alignment drive unit has an active and/or passive damping system for damping vibrations and shocks acting on the transport surface.

11. The mobile robot according to claim 1, characterized in that the alignment drive unit is adapted for turning the transport surface around a vertical spatial axis, in particular by angular steps of 90°, and/or in that the driving base comprises at least three, in particular four, omni wheels, and/or in that the transport module has a funnel narrowing towards the transport surface, the funnel being adapted to compensate for lateral misalignment of the transport surface relative to the interface module upon docking.

12. The mobile robot according to claim 1, characterized in that, the mobile robot has two or more transport modules, in particular at least two of the transport modules commonly sharing their alignment drive unit and/or their sensor unit.

13. A laboratory system comprising at least one interface module, at least one mobile robot according to claim 1, in particular a lane of the interface module having a funnel narrowing towards a surface of the interface module, said funnel being adapted to compensate for lateral misalignment of the transport surface relative to the interface module upon docking.

14. A method for operating a laboratory system according to claim 13, the method comprising the steps of moving, in particular autonomously driving, the mobile robot over the laboratory floor, and docking the mobile robot to the interface module, wherein the sensor unit detects a misalignment in positioning of the transport surface relative to the interface module and the alignment drive unit adjusts the transport surface to compensate for detected misalignment, loading at least one sample container carrier off the transport surface to the interface module and/or unloading at least one sample container carrier off the interface module to the transport surface.

15. The method according to claim 14, characterized in that the transport module of the mobile robot has a driveable sledge for pushing sample container carriers in a transport direction of the transport module over the transport surface and/or for retaining sample container carriers against the transport direction, the transport module having a driveable slider for pushing sample container carriers in the transport direction off the transport surface, and/or for pushing sample container carriers against the transport direction onto the transport surface, and/or for retaining sample container carriers in the transport direction, and the slider having a barrier portion pivot-drivable relative to the transport surface around the transport direction, the barrier portion being pivotable between a horizontal orientation for engaging with sample container carriers and an upright orientation for passing by sample container carriers;

the step of loading the interface module comprising pivoting the barrier portion to its upright orientation and driving the sledge to push sample container carriers in the transport direction so that the pushed sample container carriers pass by the barrier portion, pivoting the barrier portion to its horizontal orientation and driving the slider to push the sample container carriers that have previously passed by the barrier portion in the transport direction off the transport surface and into the interface module; and/or the step of unloading the interface module comprising pivoting the barrier portion to its upright orientation and driving an interface sledge of the interface module to push sample container carriers against the transport direction so that the sample container carriers pass by the barrier portion to then be placed on the transport surface, pivoting the barrier portion to its horizontal orientation and driving the slider to push the sample container carriers that have previously passed by the barrier portion against the transport direction onto the transport surface to then be placed on the transport surface, and retaining the sample container carriers placed on the transport surface in the transport direction by the barrier portion in its horizontal orientation.

* * * * *